United States Patent [19]

Nakagawa

[11] Patent Number: 5,128,957
[45] Date of Patent: Jul. 7, 1992

[54] INITIAL ACQUISITION METHOD IN SPREAD SPECTRUM SYSTEM AND SUCH SYSTEM

[75] Inventor: Yoshikatsu Nakagawa, Yomato, Japan

[73] Assignee: Ricoh Company, Ltd., Tokyo, Japan

[21] Appl. No.: 741,675

[22] Filed: Aug. 7, 1991

[30] Foreign Application Priority Data

Aug. 10, 1990 [JP] Japan ................................ 2-211875
Oct. 18, 1990 [JP] Japan ................................ 2-280290
Nov. 16, 1990 [JP] Japan ................................ 2-312164
Mar. 1, 1991 [JP] Japan ................................ 3-061176

[51] Int. Cl.$^5$ ............................................. H04K 1/00
[52] U.S. Cl. ....................................................... 375/1
[58] Field of Search ............................................. 375/1

[56] References Cited

U.S. PATENT DOCUMENTS

| | | | |
|---|---|---|---|
| 4,550,414 | 10/1985 | Guinon et al. ........................... | 375/1 |
| 4,761,796 | 8/1988 | Dunn et al. .............................. | 375/1 |
| 4,914,699 | 4/1990 | Dunn et al. .............................. | 375/1 |
| 4,943,978 | 7/1990 | Rice ........................................ | 375/1 |

OTHER PUBLICATIONS

John Wiley & Sons, pp. 116–117 and pp. 181–183, 1977, "Spread Spectrum System".

Primary Examiner—Salvatore Cangialosi
Attorney, Agent, or Firm—Oblon, Spivak, McClelland, Maier & Neustadt

[57] ABSTRACT

A spread spectrum system includes a transmitter in which a frequency of a pseudonoise sequence signal is modulated in accordance with information, and a receiver in which a received pseudonoise sequence signal is demodulated based on a synchronization between the received pseudonoise sequence siganl and a reference pseudonoise sequence signal having the same basic frequency as the received pseudonoise sequence signal. An initial acquisition method used in the spread spectrum system includes the following steps (a) and (b) of:

(a) transmitting a training signal from the transmitter, the training signal being obtained by changing the frequency of the transmitted pseudonoise sequence signal from the basic frequency before the frequency of the transmitted pseudonoise sequence signal is modulated; and (b) carrying out a sliding correlation in the receiver based on a difference between a frequency of the training signal and the basic frequency of the reference pseudonoise sequence signal, so that an initial acquisition is achieved by the sliding correlation.

26 Claims, 11 Drawing Sheets

TRAINING    ACTUAL DATA $\Delta S$: FASE ERROR

INITIAL ACQUISITION METHOD IN SPREAD SPECTRUM SYSTEM AND SUCH SYSTEM

BACKGROUND OF THE INVENTION

The present invention generally relates to an initial acquisition method for use in a spread spectrum system, and more particularly to an initial acquisition method in a spread spectrum system in which a frequency modulation of a predetermined code signal is carried out based on information. The present invention also relates to such a spread spectrum system.

Conventionally, a clock rate modulation and a sliding correlation, which are carried out in a spread spectrum system, have been disclosed in "Spread Spectrum System", John Wiley & Sons, pp. 116-117 and pp. 181-183 (1977). In the conventional clock rate modulation, a frequency modulation of a predetermined code sequence is carried out, and then the modulated signal is transmitted from a transmitter to a receiver. A spread spectrum communication can be executed by use of the above clock rate modulation.

The sliding correlation is the simplest of all the correlation techniques. In a general sliding correlation, a receiver, when searching for synchronization, operates a code sequence generator therein at a rate different from that of a code sequence generator in a transmitter. Two code sequences slip in phase with respect to each other (on an oscilloscope), and the slipping of the two code sequences stops only when synchronization is achieved between the two code sequences. The advantage of the sliding correlator is its simplicity. That is, nothing is required other than some means for shifting a code clock used in the receiver by commands. The difficulty of using a simple sliding correlator for achieving synchronization, is that, when a large degree of synchronization uncertainty is encountered, it is required that all possible code phase positions be examined, which is impractical because much is required to do so. Recognition of synchronization, which must occur to stop the sliding or searching process at or near the point of synchronization, is limited in response time by the bandwidth of the system's postcorrelation receiver. Thus the rate of searching, or sliding, through all of the possible code phase offset positions is also limited by this bandwidth.

In a case where the above sliding correlation is applied to an initial acquisition in the spread spectrum system in which the clock rate modulation is performed, a receiver can be constituted, for example, as shown in FIG. 1. The initial acquisition is required for maintaining a receiver at a state where a reference code signal in the receiver can be tracked on a code signal transmitted from a transmitter. In the initial acquisition, the synchronization between the two code signals is achieved.

Referring to FIG. 1, a receiver has a amplifier 6, a frequency converter 7, a correlator 13, an absolute value calculation circuit 14, a comparator 15, and a delay-locked loop (DLL) 12. A signal transmitted from a transmitter is received by an antenna of the receiver, and then a received signal is supplied via the amplifier 6 and the frequency converter 7 to the DLL 12 and the correlator 13. The DLL 12 includes a voltage control oscillator (VCO) 18, a PN signal generator 19, a correlation network 20 and a loop filter 20a. The VCO 18 can operate at a self-running frequency $f_{self}$. The PN signal generator generates a reference code signal of the PN sequence based on the output signal from the VCO 18.

The correlation network 20 generates a correlation value between the reference code signal and a received code signal (PN sequence). The correlator 13 calculates a correlation value between the reference code signal (PN sequence) and the received code signal (PN sequence). The correlation value is supplied from the correlator 13 via the absolute calculator 14 to the comparator 15. The comparator 15 compares the correlation value and a predetermined threshold value $V_{th}$ and outputs a synchronization detecting signal when the correlation value is greater than or equal to the threshold value $V_{th}$.

The receiver also has a switch 16 and an adder 17. The adder 17 adds a voltage $V_{rx}$ to the correlation value output from the loop filter 20a in the DLL 12. The switch 16 has a common terminal (C), a first terminal (I), and a second terminal (II). A voltage $(V_{rx}+\Delta V)$ is supplied to the first terminal (I) of the switch 16, and an output of the adder 17 is supplied to the second terminal (II) thereof. The common terminal (C) of the switch 16 is connected to the VCO 18 in the DLL 12. The switch 16 is initially maintained at the first terminal (I), and then switched to the second terminal (II) by the synchronization detecting signal output from the comparator 15.

In the above case, the transmitter is also provided with a VCO which can operate at a self-running frequency $f_{self}$. In the transmitter, a code signal (PN sequence) generated based on an output of the VCO is modulated in accordance with the information. When the voltage $V_{rx}$ is supplied to the VCO 18, the VCO 18 operates at the self-running frequency. The voltage $V_{rx}$ is equal to a voltage $V_{tx}$ by which the VCO in the transmitter operates at the self-running frequency $f_{self}$. When the voltage $(V_{rx}+\Delta V)$ including an offset voltage $\Delta V$ is supplied via the switch 16 to the VCO 18, the frequency of a signal output from the VCO 18 increases by an offset frequency $\Delta f$ corresponding to the above offset voltage $\Delta V$. Thus, phases of the reference code signal and the received code signal slips with respect to each other. In this condition, the correlator 13 calculates the correlation value between the reference code signal and the received code signal. Then, when the correlation value becomes greater than or equal to the threshold value $V_{th}$, it is determined that the initial acquisition has been achieved; that is, the comparator 15 outputs the synchronization detecting signal.

When the switch 16 is switched from the first terminal (I) to the second terminal (II) by the synchronization detecting signal supplied from the comparator 15, the voltage $V_{rx}$ corresponding to the self-running frequency $f_{self}$ and the correlation value between the reference code signal and the received code signal are supplied to the VCO 18. Then, the DLL 12 carries out a tracking process with respect to the two code signals so that synchronization between the two code signals is achieved. The DLL 12 generates a demodulation signal by the tracking process.

As has been described above, in a case where the sliding correlation is applied to the initial acquisition in the spread spectrum system in which the clock modulation is carried out, a circuit for achieving the initial acquisition, which includes the correlator 13, the absolute calculator 14, the comparator 15, and the switch 16, must be provided in the receiver. As this circuit including the correlator 13 and so on can not be a simple one, the constitution of the receiver becomes complex.

SUMMARY OF THE INVENTION

Accordingly, a general object of the present invention is to provide a novel and useful initial acquisition method for use in a spread spectrum system, and such a system, in which the above disadvantage is eliminated.

A more specific object of the present invention is to provide an initial acquisition method in a spread spectrum system in which the constitution of a receiver in the spread spectrum system can be simple.

The above objects of the present invention are achieved by an initial acquisition method for use in a spread spectrum system having a transmitter in which a frequency of a first code signal is modulated in accordance with information, the first code signal repeating a predetermined pattern at a basic frequency, and a receiver in which a received first code signal is demodulated based on a synchronization between the received first code signal and a second code signal which repeats the same pattern at the same basic frequency as the first code signal, the initial acquisition method comprising the following steps (a) and (b) of: (a) transmitting a training signal from the transmitter, the training signal being obtained by changing the frequency of the first code signal from the basic frequency before the frequency of the first code signal is modulated; and (b) carrying out a sliding correlation in the receiver based on a difference between a frequency of the training signal and the basic frequency of the second code signal, so that an initial acquisition is achieved by the sliding correlation.

The above objects of the present invention are also achieved by a spread spectrum system comprising: a transmitter which modulates a frequency of a first code signal in accordance with information, the first code signal repeating a predetermined pattern at a basic frequency; and a receiver which demodulates a received first code signal based on a synchronization between the received first code signal and a second code signal which repeats the same pattern at the same basic frequency as the first code signal, wherein the transmitter has: training means for transmitting a training signal which is obtained by changing the frequency of the first code signal from the basic frequency before the frequency of the first code signal is modulated, and the receiver has: correlation means for carrying out a sliding correlation based on a difference between a frequency of the training signal and the basic frequency of the second code signal, so that an initial acquisition is achieved by the sliding correlation.

According to the present invention, the frequency of the first code signal which is obtained in the transmitter is changed so that the training signal is obtained, then the sliding correlation is carried out in the receiver by use of the second code signal and the training signal transmitted from the transmitter. It is not necessary to change the frequency of the second code signal for the sliding correlation in the receiver. Thus, the constitution of the receiver in the spread spectrum system can be simple.

Additional objects, features and advantages of the present invention will become apparent from the following detailed description when read in conjunction with the accompanying drawings.

DESCRIPTION OF THE PREFERRED EMBODIMENTS

A description will now be given of embodiments of the present invention.

Figure 2:
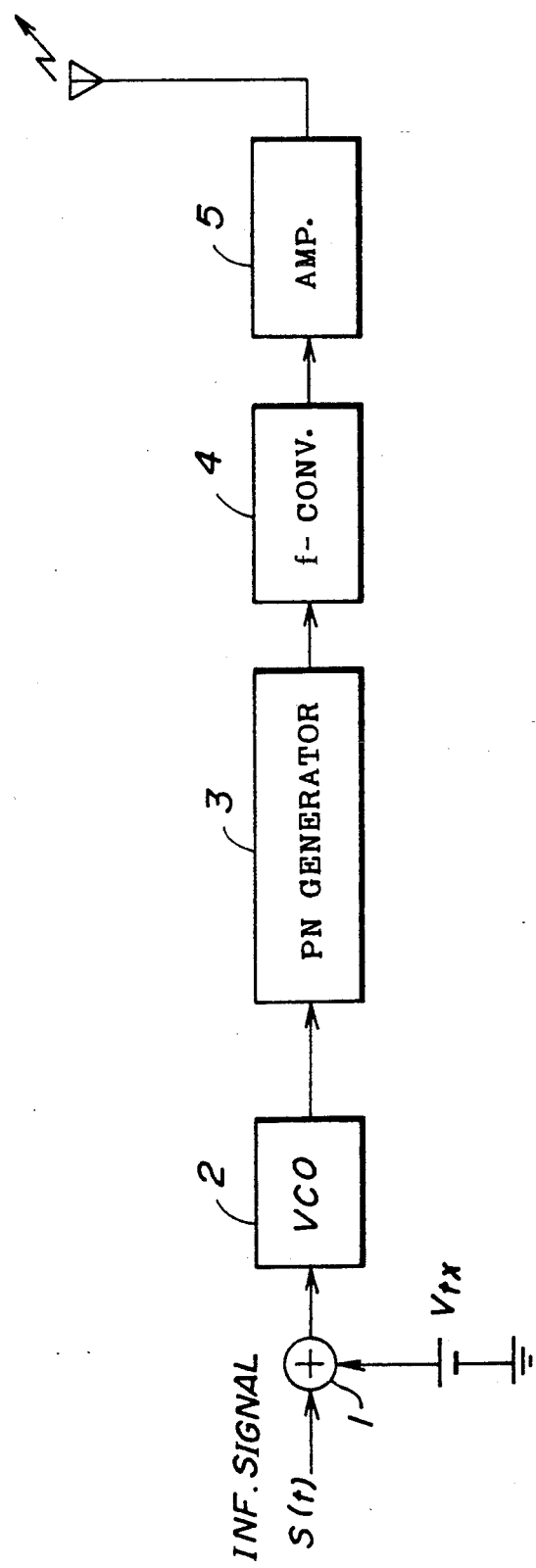
FIG. 2 is a block diagram illustrating a transmitter of the spread spectrum system according to an embodiment of the present invention.

FIG. 2 shows a transmitter in a spread spectrum system according to the present invention.

Referring to FIG. 2, the transmitter has an adder 1, a voltage control oscillator (VCO) 2, a PN signal generator 3, a frequency converter 4, and an amplifier 5. When a voltage $V_{tx}$ is supplied to the VCO 2, the VCO 2 can operate at a self-running frequency $f_{self}$. An information signal S(t) is added to the voltage $V_{tx}$ by the adder 1 and supplied to the VCO 2. That is, the VCO 2 is modulated in accordance with the information signal S(t). The PN signal generator 3 generates a pseudonoise (PN) sequence in synchronism with an output signal from the VCO 2. As a result, a code signal of the PN sequence, in which a clock rate modulation (a frequency modulation) is performed, is output from the PN signal generator 3. Then the code signal, which has passed through the frequency converter 4 and the amplifier 5, is transmitted from an antenna.

Figure 3:
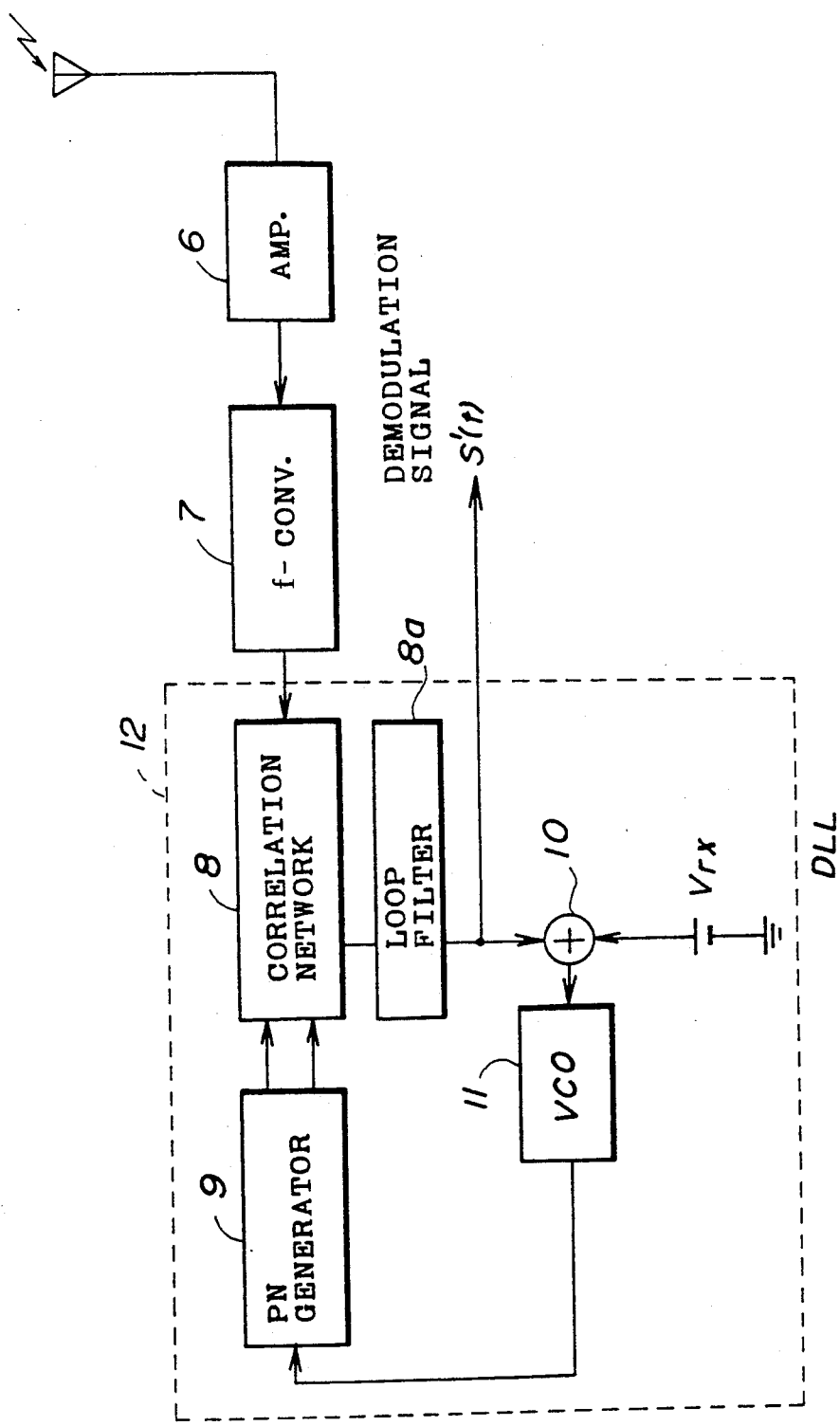
FIG. 3 is a block diagram illustrating a receiver of the spread spectrum system according to the embodiment of the present invention.

FIG. 3 shows a receiver in the spread spectrum system according to the present invention.

Figure 1:
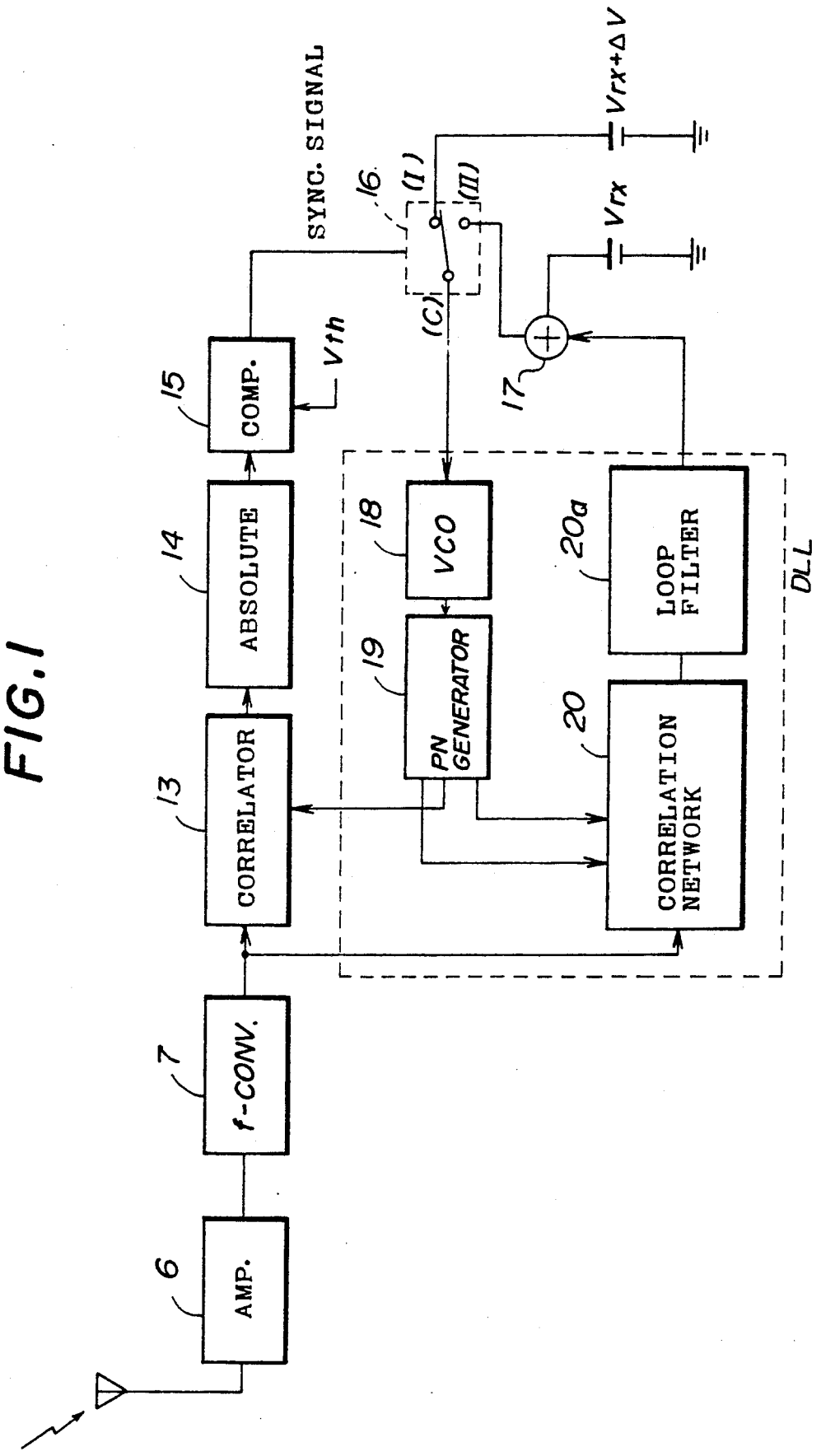
FIG. 1 is a block diagram illustrating a receiver which can be constituted in a case where a sliding correlation is applied to an initial acquisition in a spread spectrum system in which a clock modulation is carried out.

Referring to FIG. 3, the receiver has an amplifier 6, a frequency converter 7, and a delay-locked loop (DLL) 12. The DLL 12 includes a correlation network 8, a loop filter 8a, a PN signal generator 9 and a voltage control oscillator (VCO) 11, in the same manner as that shown in FIG. 1. In the DLL 12, a correlation value from the correlation network 8 is supplied via the loop filter 8a to an adder 10. A voltage $V_{rx}$ is also supplied to the adder 10. The adder 10 adds the correlation value to the voltage $V_{rx}$ and supplies an output signal to the VCO 11. A demodulation signal S'(t) is generated based on the correlation value between the reference code signal output from the PN signal generator 9 and the received code signal. The voltage $V_{rx}$, which is supplied via the adder 10 to the VCO 11, corresponds to the self-running frequency $f_{self}$ in the VCO 11, and is equal to the voltage $V_{tx}$ supplied via the adder 1 to the VCO 2 in the transmitter. The receiver shown in FIG. 3 does not have the correlator 13, the absolute value calculator 14, the comparator 15 and the switch 16 shown in FIG. 1.

Figure 4:
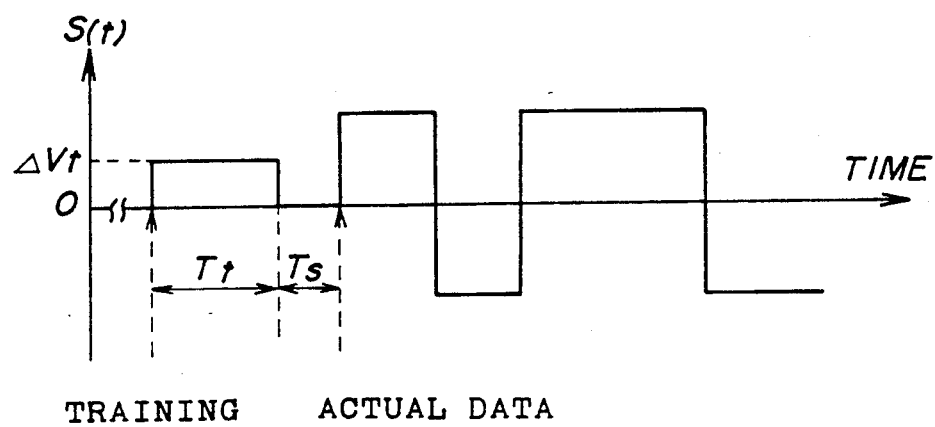
FIG. 4 is a diagram illustrating a waveform of a first information signal transmitted from the transmitter.

The waveform of the information signal S(t) supplied via the adder 1 to the VCO 2 in the transmitter shown in FIG. 2 is formed as shown in FIG. 4.

Referring to FIG. 4, a training period $T_t$ is set before a data transmission period in which actual data is transmitted. In the training period $T_t$, training data is supplied to the VCO 2 in the transmitter. The training data is set at an offset voltage $\Delta V_t$. When the training data $\Delta V_t$ is supplied to the VCO 2, the self-running frequency $f_{st}$ in the VCO 2 is changed by an offset frequency $\Delta f_{st}$. That is, the VCO 2 in the transmitter operates at a self-running frequency $(f_{st} + \Delta f_{st})$ in the training period $T_t$. Then, the transmitter transmits a code signal which is obtained by the clock rate modulation based on the information signal S(t) shown in FIG. 4.

In the receiver which receives the transmitted code signal from the transmitter, the frequency of the reference code signal (PN sequence) differs from the frequency of the received code signal by the offset frequency $\Delta f_{st}$, in the training period $T_t$. Thus, in the DLL 12, the phase of the reference code signal and the phase of the received code signal are continuously slipping, so that the sliding correlation is carried out. Since both code signals periodically vary while the sliding correlation is being carried out, the difference between the phase of the reference code signal and the phase of the received code signal is brought within a range of a delay discrimination characteristic. With in the range of the delay discrimination characteristic of the DLL 12, it can be deemed that the synchronization between two code signals is achieved. For example, in a 2Δ type of DLL, the range of the delay discrimination characteristic is within ±2Δ, where Δ is a chip length of the PN sequence. When the difference between the two phases is brought within the range of the delay discrimination characteristic of the DLL 12 in the receiver, the above sliding correlation is completed. That is, the initial acquisition is achieved. After this, the DLL 12 carries out the tracking process in the same manner as that in the above case which has been described with reference to FIG. 1. Thus, the received signal corresponding to the actual data is demodulated.

In a case where the difference between the phase of the reference code signal and the phase of the received code signal happens to be initially within the range of the delay discrimination characteristic, the above sliding correlation is not carried out in the training period $T_t$.

The training data $\Delta V_t$ is set so that the offset frequency $\Delta f_{st}$ corresponding to the training data $\Delta V_t$ is within a pull-in range $\Delta f_p$ of the DLL ($|\Delta f_{st}| < |\Delta f_p|$). In general, the pull-in range $\Delta f_p$ of the DLL is narrower than a lock-in range $\Delta f_l$ thereof. Thus, in the above condition ($|\Delta f_{st}| < |\Delta f_p|$), even if the receiver is continuously receiving the transmitted code signal corresponding to the training data after the initial acquisition has been achieved, the synchronization between two code signals can be maintained.

The training period $T_t$ is set so that the phase can be slid, in the sliding correlation, at least in one period of the PN sequence (the reference code signal or the received code signal) having a lower chip rate. In a case where the offset frequency $\Delta f_{st}$ is positive, the training period $T_t$ is, for example, set at N $(1/\Delta f_{st})$.

The smaller the offset frequency $\Delta f_{st}$ is, the longer the training period $T_t$ becomes. That is, when the offset frequency $\Delta f_{st}$ is small, a long time is required to achieve the initial acquisition. Thus, the offset frequency $\Delta f_{st}$ is set so as to be as large as possible within the pull-in range of the DLL.

A period $T_s$, starting from a time at which the training period $T_t$ ends and ending at a time at which the actual data starts being transmitted, is provided in the information signal S(t), as shown in FIG. 4. When the frequency of the code signal (the PN sequence) rapidly varies so that the offset frequency $\Delta f_{st}$ becomes zero, a transient response is generated in the DLL. The period $T_s$ in the information signal S(t) is a period required to make the transient response converge to zero. Thus, the period $T_s$ is set at a time within which the DLL can converge to a normal state after the offset frequency $\Delta f_{st}$ has become zero. The period $T_s$ is also used for separating the training data from the actual data.

Figure 5:
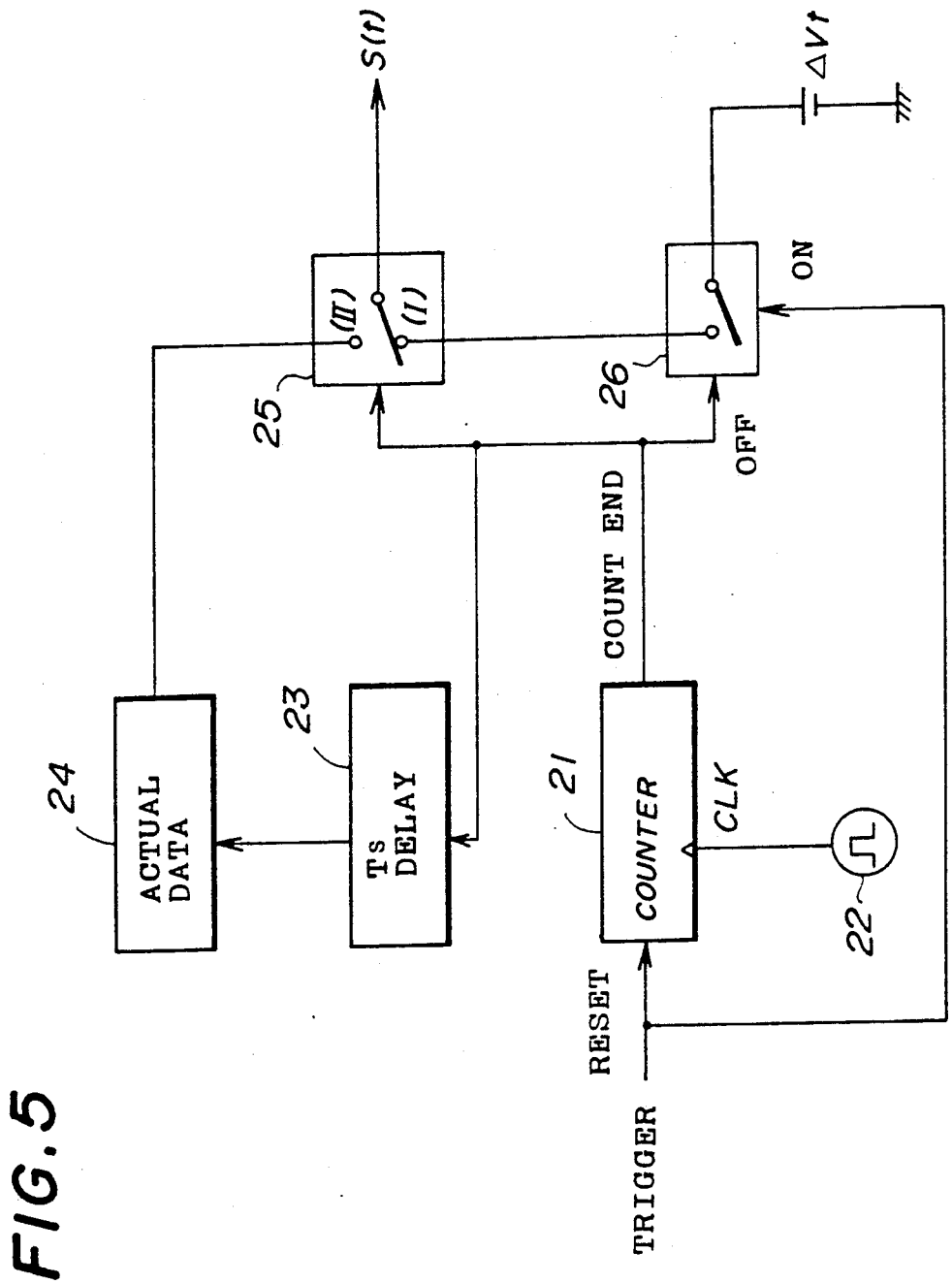
FIG. 5 is a block diagram illustrating a circuit generating the first information signal shown in FIG. 4.

The information signal S(t) including the training data and the actual data, shown in FIG. 4, is generated by a circuit shown, for example, in FIG. 5.

Referring to FIG. 5, the circuit has a counter 21, a clock generator 22, a delay circuit 23, an actual data generator 24, a first switch 25, and a second switch 26. The counter 21 is reset by a trigger signal which is supplied from a controller (not shown) at a time communication is started. The counter 21 counts a clock signal supplied from the clock generator 22. When a count value in the counter 21 reaches a predetermined value corresponding to the training period $T_t$, the counter 21 outputs a count ending signal. The voltage $\Delta V_t$ is supplied to the second switch 26. The second switch is initially turned on by the trigger signal. When the count ending signal is supplied from the counter 21 to the second switch 26, the second switch 26 is turned off. An output terminal of the second switch 26 is connected to a first terminal (I) of the first switch 25. The actual data generator 24 is connected to a second terminal (II) of the first switch 25. The first switch 25 normally selects the first terminal (I). When the count ending signal is supplied from the counter 21 to the first switch 25, the first switch 25 is switched from the first terminal (I) to the second terminal (II). The delay circuit 23 is activated by the count ending signal supplied from the counter 21. The delay circuit 23 supplies a starting signal after the period $T_s$ elapses from a time at which the delay circuit 23 is activated. When the starting signal is supplied from the delay circuit 23 to the actual data generator 24, the actual data generator 24 outputs the actual data.

The circuit shown in FIG. 5 operates as follows.

When the trigger signal is supplied from the controller to the circuit at the time communication is started, the second switch 26 is turned on. Thus, the voltage $\Delta V_t$ is supplied via the second switch 26 and the first switch 25, as the information signal S(t), to the adder 1 in the transmitter shown in FIG. 2. At this time, the counter 21 starts counting the clock signal supplied from the clock generator 22. Then, when the counter 21 in which the count value reaches the predetermined value outputs the count ending signal, the first switch 25 is switched from the first terminal (I) to the second terminal (II), the second switch 26 is turned off, and the delay circuit 23 is activated. Since the actual data generator 24 does not output the actual data at this time, the information signal S(t) includes neither the training data nor the actual data. Then, after the period $T_s$ has elapsed from a time at which the counter 21 outputs the count ending signal, the actual data generator 24 starts outputting the actual data based on the starting signal supplied from the delay circuit 23. Thus, the actual data is supplied via the first switch 25, as the information signal S(t), to the adder 1 in the transmitter.

Since the circuit shown in FIG. 5 operates in accordance with the above process, the circuit outputs the information signal S(t) shown in FIG. 4.

In the above embodiment, the code signal (PN sequence) having the offset frequency $\Delta f_{st}$ corresponding to the training data is transmitted during the training period $T_t$. Thus, in the DLL 12 in the receiver, the reference code signal (PN sequence) and the received code signal slip in phase with respect to each other. That is, the DLL 12 in the receiver carries out the sliding correlation, so that the initial acquisition is achieved.

Figure 6:
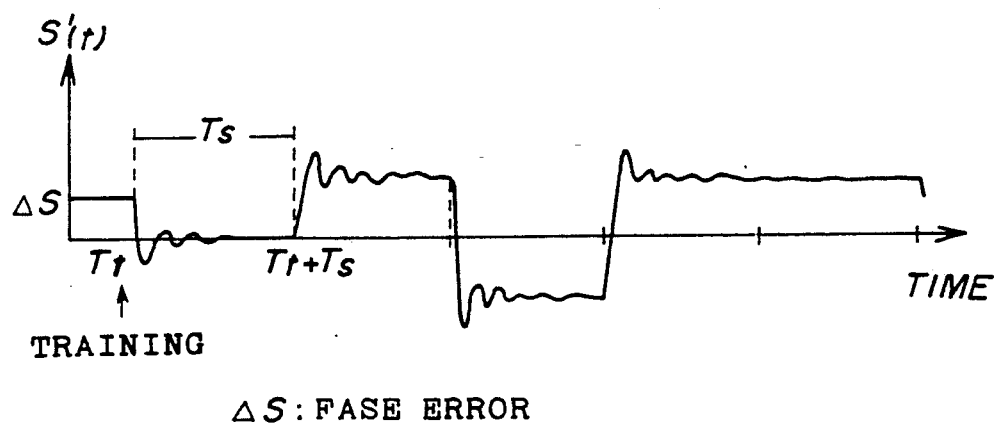
FIG. 6 is a diagram illustrating a waveform of a demodulated signal corresponding to the first information signal shown in FIG. 4.

When the code signal which is modulated in accordance with the information signal S(t) shown in FIG. 4 is transmitted from the transmitter, the DLL 12 in the receiver generates a phase control signal S'(t) (a demodulated signal) as shown in FIG. 6. In the demodulated signal shown in FIG. 6, when a phase error signal $\Delta S$ corresponding to the offset frequency $\Delta f_{st}$ falls down at an end of the training period $T_t$, an overshoot is generated in the demodulated signal based on the transient response of the DLL. The overshoot is converged to zero during the period $T_s$. The period $T_s$ depends on a frequency step response characteristic and a phase step response characteristic of a closed loop transfer function in the DLL.

A description will now be given of a second information signal S(t), in which the above period $T_s$ can be eliminated, with reference to FIG. 7.

Figure 7:
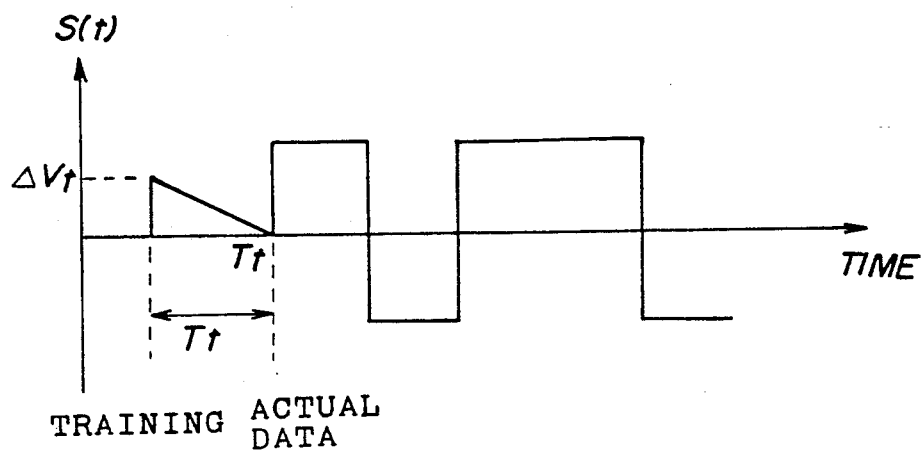
FIG. 7 is a diagram illustrating a waveform of a second information signal transmitted from the transmitter.

Referring to FIG. 7, the level of the training data gradually decreases. That is, the second information signal S(t) corresponding to the training data has a sawtooth waveform. The initial level $\Delta V_t$ of the training data is set so that the offset frequency $\Delta f_{st}$ corresponding to the initial level $\Delta V_t$ is within the pull-in range of the DLL. The offset frequency $\Delta f_{st}$ is represented as follows, $$\Delta f_{st} = K \cdot \Delta V_t$$

where K is a sensitivity (Hz/V) of the VCO.

A frequency offset $\Delta f_{sc}$ at a time t is represented as follows, $$\Delta f_{sc} = (1 - t/t_t) \cdot \Delta f_{st}$$

Thus, a number n of chips which slip during the sliding correlation in the training period $T_t$ is represented by the following formula.

$$n = \int_0^{T_t} (\Delta f_{sc}) \cdot dt = (T_t/2) \cdot \Delta f_{st}$$

The training period $T_t$ is set so that the following inequality stands.

$$T_t > (2N/\Delta f_{st})$$

The level of the training data at the end of the training period $T_t$ is equal to zero. Then the actual data starts being formed immediately after the end of the training period $T_t$.

Figure 9:
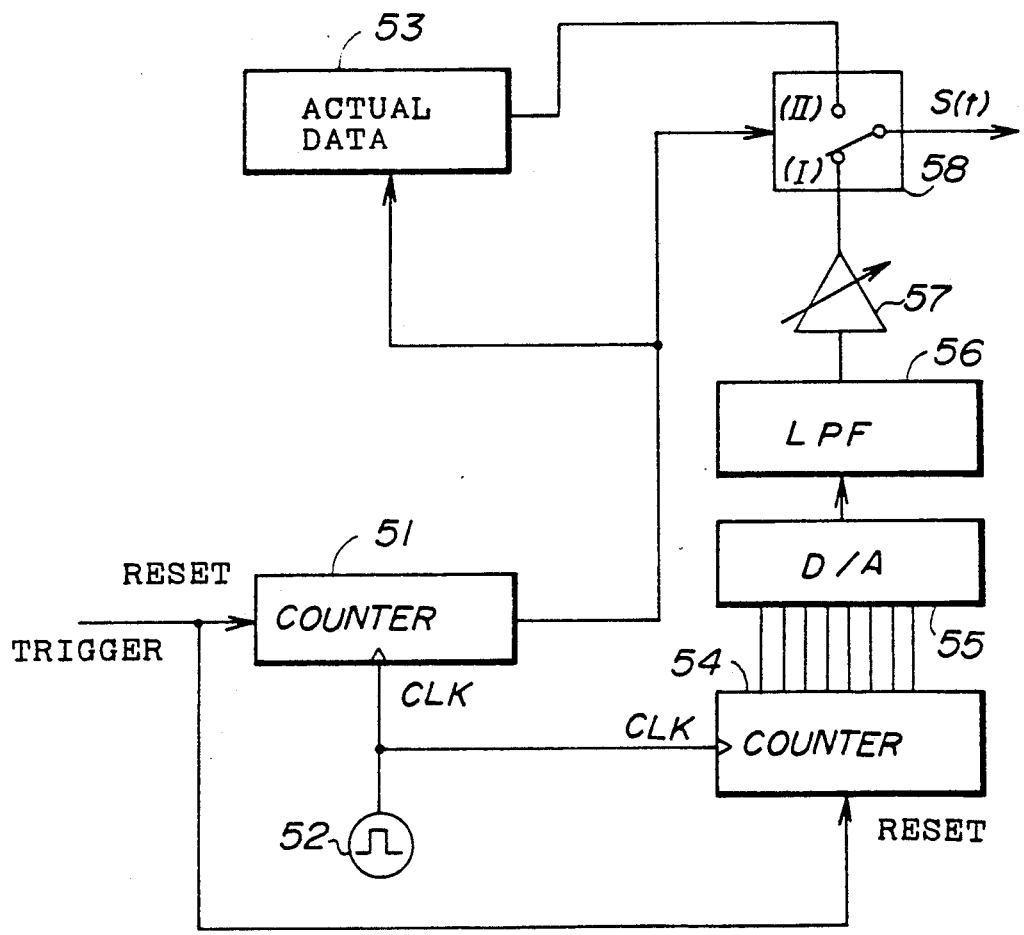
FIG. 9 is a block diagram illustrating a circuit for generating the second information signal shown in FIG. 7.

The second information signal S(t) including the sawtooth shaped training data and the actual data, shown in FIG. 7, is generated by a circuit, for example, shown in FIG. 9.

Figure 10:
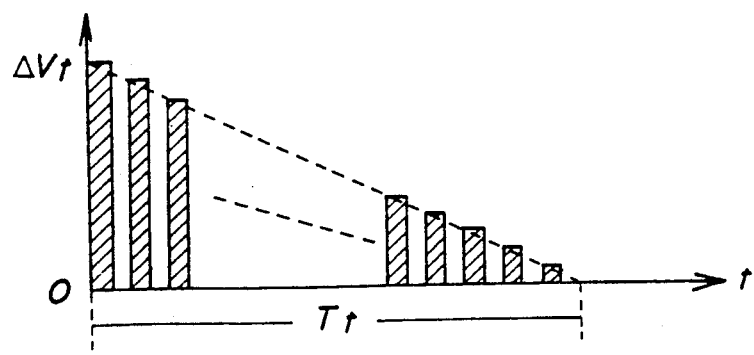
FIG. 10 is a detailed diagram illustrating training data included in the second information signal shown in FIG. 7.

Referring to FIG. 9, the circuit has a first counter 51, a clock generator 52, an actual data generator 53, a second counter 54, a digital to analog converter 55, a low pass filter (LPF)56, a variable-gain amplifier 57, and a switch 58. The first counter 51 and the second counter 54 are reset and activated by a trigger signal supplied from a controller (not shown) at the time communication is started. The first counter 51 increments in synchronism with a clock signal supplied from the clock generator 52. When a count value in the first counter 51 reaches a value corresponding to the training period $T_t$, the first counter 51 outputs a count ending signal. The second counter 54 has an initial value corresponding to the initial level $\Delta V_t$ of the training data. The second counter 54 decrements from the initial value in synchronism with the clock signal. A count value in the second counter 54 decreases as shown in FIG. 10 in synchronism with the clock signal. The digital to analog converter 55 converts the count value, which varies in the second counter 54 as shown in FIG. 10, into a voltage level. The variable gain amplifier 57 adjusts the level of the training data. The frequency of the clock signal output from the clock generator 52, the number of bits of the digital to analog converter 55, and the gain of the variable gain amplifier 57 are respectively adjusted to suitable values, so that a signal, which varies from the initial level $\Delta V_t$ to zero within the training period $T_t$ as shown in FIG. 10, is obtained at the output of the variable-gain amplifier 57. The output of the variable-gain amplifier 57 is connected to the first terminal (I) of the switch 58. The actual data generator 53 is connected to a second terminal (II) of the switch 58. The switch 58 initially selects the first terminal (I). When the count ending signal is supplied from the first counter 51 to the switch 58, the switch 58 is switched from the first terminal (I) to the second terminal (II). When the count ending signal is supplied from the first counter 51 to the actual data generator 53, the actual data generator 53 is activated and starts outputting the actual data.

The circuit shown in FIG. 9 operates as follows.

When the trigger signal is supplied to this circuit at the time communication is started, the second counter 54 gradually decrements from the initial value. Thus, the training data as shown in FIG. 10 is supplied via the switch 58, as the information signal S(t), to the adder 1 in the transmitter shown in FIG. 2. When the count value in the first counter 51 reaches the predetermined value corresponding to the training period $T_t$, the switch 58 is switched from the first terminal (I) to the second terminal (II) and the actual data generator 53 is activated. At this time, the count value in the second counter 54 reaches zero so that the level of the training data becomes zero. While the switch 58 is being maintained at the second terminal (II), the actual data is supplied via the switch 58, as the information signal S(t), to the adder 1 in the transmitter.

Since the circuit shown in FIG. 9 operates in accordance with the above process, the circuit outputs the information signal S(t) shown in FIG. 7.

Figure 8:
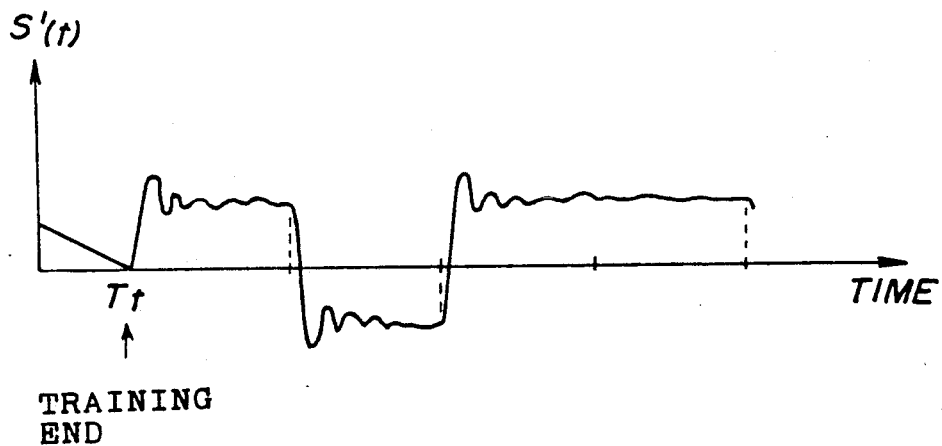
FIG. 8 is a diagram illustrating a waveform of a demodulated signal corresponding to the second information signal shown in FIG. 7.

When the code signal which is modulated in accordance with the information signal S(t) shown in FIG. 7 is transmitted from the transmitter, the DLL 12 in the receiver generates a phase control signal S'(t) (a demodulated signal) as shown in FIG. 8. In this embodiment, since the level of the training data gradually decreases as shown in FIG. 10, there is no transient response at the end of the training period $T_t$. Thus, even if the actual data is transmitted immediately after the training period $T_t$, the actual data can be stably demodulated after the initial acquisition has been achieved. That is, the period $T_s$ during which there is no data transmitted can be omitted from the information signal S(t), so that effective communication between the transmitter and the receiver can be carried out.

In the second information signal S(t) shown in FIG. 7, the level of the training data rapidly rises up at a starting time of the training period $T_t$. In this case, the DLL in the receiver can become unstable by the transient response generated at this starting time of the training period $T_t$.

A description will now be given of a third information signal S(t) with reference to FIG. 11. Since the level of the third information signal S(t) gradually increases, the transient response generated at the starting time of the training period $T_t$ can be eliminated.

Figure 11:
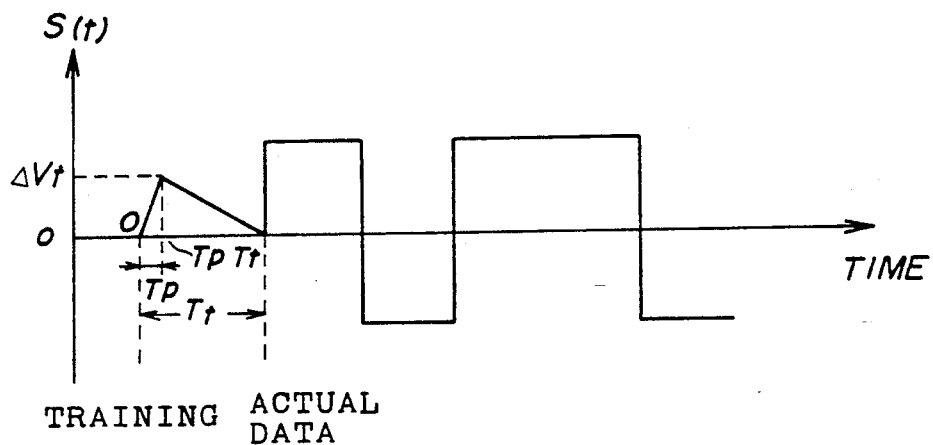
FIG. 11 is a diagram illustrating a third information signal transmitted from the transmitter.

Referring to FIG. 11, the level of the training data gradually increases from zero to $\Delta V_t$ at a rate of $(\Delta V_t/T_p)$ during $T_p$ from a starting time of the training period $T_t$. Then, the level of the training data gradually decreases from $\Delta V_t$ to zero at a rate of $(\Delta V_t - T_p))$ for the training period $T_t$. That is, the information signal S(t) corresponding to the training data has a triangular waveform. $T_p$ can be set at a time within a range of $T_t > T_p > 0$. $\Delta V_t$ is set so that the offset frequency $\Delta f_{st}$ corresponding to the $\Delta V_t$ is within the pull-in range of the DLL, in the same manner as that of the second information signal shown in FIG. 7.

A frequency offset $\Delta f_{sc}$ generated by the training data at a time t is represented as follows.

$$\Delta f_{sc} = \begin{cases} (\Delta f_{st}/T_p) \cdot t & (0 \leq t < T_p) \\ [(T_t - t)/(T_t - T_p)] \cdot \Delta f_{st} & (T_p \leq t < T_t) \end{cases}$$

Thus, a number n of chips which slip during the sliding correlation in the training period $T_t$ is represented by the following formula.

$$n = \int_0^{T_t} (\Delta f_{sc}) \cdot dt = (T_t/2) \cdot \Delta f_{st}$$

The training period $T_t$ is set so that the following inequality stands.

$$T_t > (2N/\Delta f_{st})$$

This condition is the same as that in the case of the second information signal shown in FIG. 7.

The level of the training data at the end of the training period $T_t$ is equal to zero. The actual data starts being formed immediately after the end of the training period $T_t$.

Figure 12:
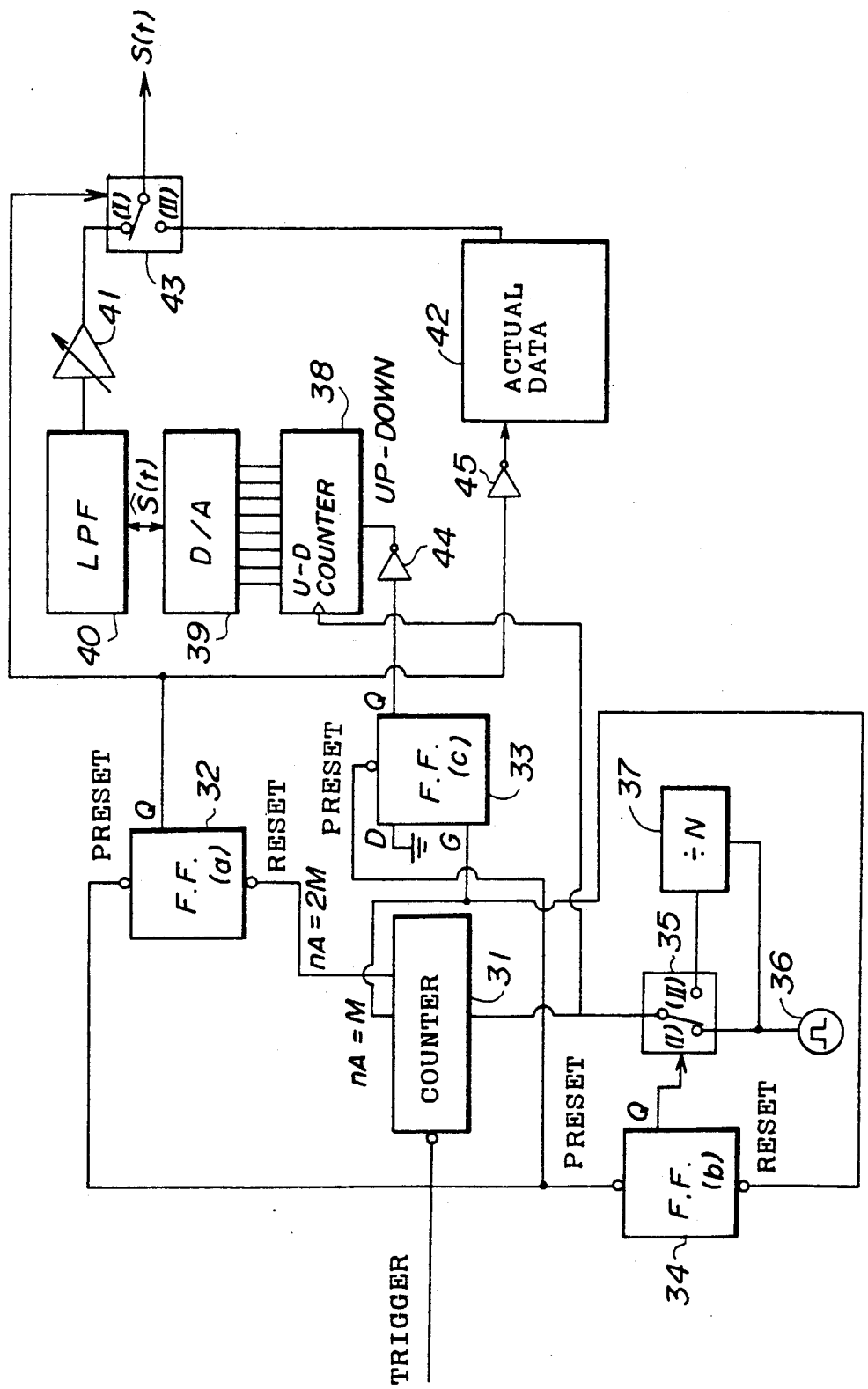
FIG. 12 is a block diagram illustrating a circuit for generating the third information signal shown in FIG. 11.

The third information signal S(t) including the triangular shaped training data and the actual data, shown in FIG. 11, is generated by a circuit shown, for example, in FIG. 12.

Referring to FIG. 12, the circuit has a counter 31, a first flip flop 32, a second flip flop 33, a third flip flop 34, a first switch 35, a clock generator 36, a divider 37, an up-down counter 38, a digital to analog converter 39, a low pass filter (LPF) 40, a variable gain amplifier 41, an actual data generator 42, a second switch 43, and inverters 44 and 45. The counter 31 is activated by a trigger signal supplied from a controller (not shown) at the time communication is started. The first, second and third flip flops 32, 33, and 35 are respectively preset by the above trigger signal. The clock generator 36 is connected to a first terminal (I) of the first switch 35. The divider 37 divides the clock signal supplied from the clock generator by N and outputs an N-th divided clock signal. The N-th divided clock signal has a frequency which is one N-th of the frequency of the clock signal generated by the clock generator 36. When the third flip flop 34 is set, the first switch 35 selects the first terminal (I). When the third flip flop 34 is reset, the first switch 35 selects the second terminal (II). The counter 31 counts the clock signal supplied via the first switch 35 from the clock generator 36. When the trigger signal is supplied from the controller to the counter 31, the counter 31 starts counting the clock signal. When a count value $n_A$ in the counter 31 reaches a value M corresponding to $T_p$, the counter 31 outputs a first control signal. The second flip flop 33 and the third flip flop 34 are respectively reset by the first control signal supplied from the counter 31. When the count value $n_A$ in the counter 31 reaches 2M, the counter 31 outputs a second control signal. The first flip flop 32 is reset by the second control signal supplied from the counter 31. When the second flip flop 33 is set, the up-down counter 38 is in an up count mode based on an output signal supplied from the second flip flop 33 via the inverter 44 thereto. In this case, the up-down counter 38 increments in synchronism with the clock signal. When the second flip flop 33 is reset, the up-down counter 38 is in a down count mode based on an output signal Q of the second flip flop 33. In this case, the up-down counter 38 decrements in synchronism with a clock signal. The digital to analog converter 39 converts the count value in the up-down counter 38 into a voltage level. The voltage level output from the digital to analog converter 39, like that output from the circuit shown in FIG. 9, is processed by the low pass filter 40 and the variable gain amplifier 41. The variable gain amplifier 41 is connected to a first terminal (I) of the second switch 43. The actual data generator 42 is connected to a second terminal (II) of the second switch 43. When the first flip flop 32 is set, the second switch 43 selects the first terminal (I) based on an output signal Q from the first flip flop 32. When the first flip flop 32 is reset, the second switch is switched from the first terminal (I) to the second terminal (II). At this time, the actual data generator 42 is activated by an output signal Q supplied from the first flip flop 32 via the inverter 45 thereto.

The circuit shown in FIG. 12 operates as follows.

Figure 13:
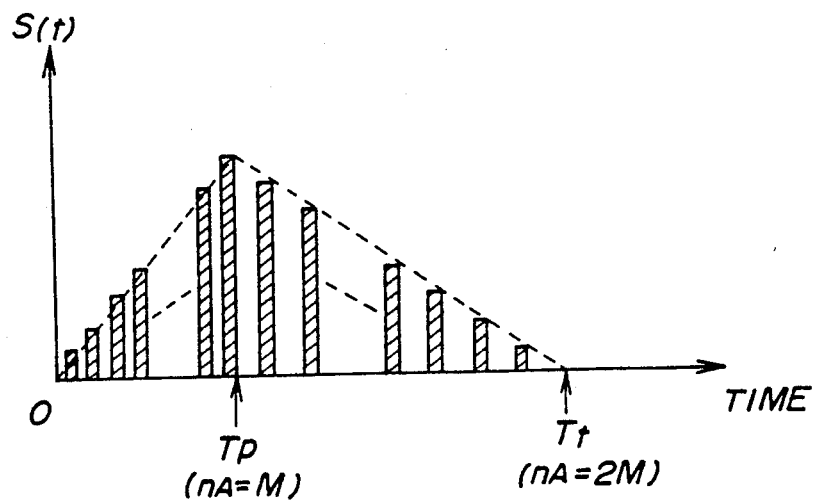
FIG. 13 is a detailed diagram illustrating training data included in the third information signal shown in FIG. 11.

When the trigger signal is supplied from the controller to this circuit at the time communication is started, the up-down counter 38 starts incrementing in synchronism with the clock signal supplied from the clock generator 36. During this up-counting of the up-down counter 38, the counter 31 counts the above clock signal. Then, when the count value in the counter 31 reaches M (corresponding to $T_p$), the up-down counter 38 starts decrementing in synchronism with the N-th divided clock signal supplied from the divider 37. During the down-counting of the up-down counter 38, the counter counts such a N-th divided clock. For example, in a case where the divider 37 outputs a second divided clock (N=2), when the count value in the counter 31 reaches 2M, the up-down counter 38 becomes zero. In this case, the count value in the up-down counter 38 varies as shown in FIG. 13. That is, the triangular shaped training data as shown in FIG. 13 is supplied via the second switch 43, as the information signal S(t), to the adder 1 in the transmitter shown in FIG. 2. In this case (N=2), the relationship between a period $T_p$ in which the up-counting of the up-down counter 38 is being performed and the training period $T_t$ is represented by a formula $3T_p = T_t$.

When the count value in the counter 31 reaches 2M, the second switch 43 is switched from the first terminal (I) to the second terminal (II). Thus, after this, the actual data output from the actual data generator 42 is supplied via the second switch 43, as the information signal S(t), to the adder 1 in the transmitter.

The period $T_p$ for the up-counting and the training period $T_t$ depend on the frequency of the clock signal output from the clock generator 36, the dividing ratio N in the divider 37, and the count value M in the counter 31 which is used for switching the up-down counter 38 from the up-counting to the down counting.

In this embodiment, since the third information signal S(t) corresponding to the training data has the triangular waveform as shown in FIG. 13, there is not any transient response at either the start or end of the training period $T_t$. Thus, the initial acquisition can be securely achieved by the sliding correlation in the DLL.

Figure 14:
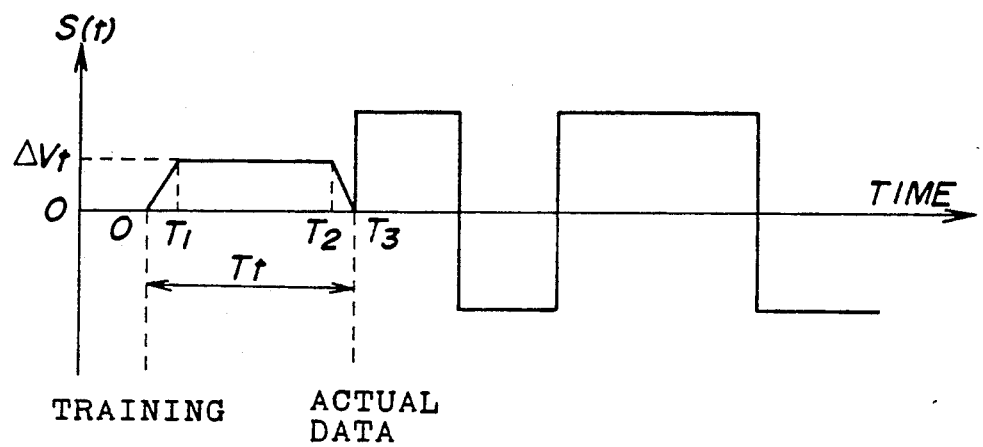
FIG. 14 is a diagram illustrating a fourth information signal transmitted from the transmitter.

A description will now be give of a fourth information signal S(t) with reference to FIG. 14.

Referring to FIG. 14, the level of the training data is zero at a starting time of the training period $T_t$. Then the level of the training data gradually increases from zero to $\Delta V_t$ at a rate of $(\Delta V_t/T_1)$ in a period 0 to $T_1$. The level of the training data is maintained at $\Delta V_t$ in a period $T_1$ to $T_2$. The level of the training data gradually decrease from $\Delta V_t$ to zero at a rate of $[(\Delta V_t/(T_3-T_2)]$ in a period $T_2$ to $T_3$. That is, the information signal S(t) corresponding to the training data has a trapezoid waveform. $T_1$ and $T_2$ are set so that an inequality $0 < T_1 < T_2 < T_3$ (end of the training) stands. The maximum level $\Delta V_t$ of the training data, like that of the second and third information signals shown in FIGS. 7 and 11, is within the pull-in range of the DLL.

A frequency offset $\Delta f_{sc}$ generated by the training data at a time t is represented as follows.

$$\Delta f_{sc} = \begin{cases} (\Delta f_{st}/T_1) \cdot t & (0 \leq t < T_1) \\ \Delta f_{st} & (T_1 \leq t < T_2) \\ \Delta f_{st} - [\Delta f_{st}/(T_3 - T_2)] \cdot t & (T_2 \leq t < T_3) \end{cases}$$

Thus, a number n of chips which slip during the sliding correlation in the training period $T_t$ is represented by the following formula.

$$n = \int_0^{T_t} (\Delta f_{sc}) \cdot dt = \Delta f_{st} \cdot [(T_3 + T_2 - T_1)/2]$$

The training period $T_t (= T_3)$ is set so that the following inequality stands.

$$T_t > (2N/\Delta f_{st}) + T_1 - T_2$$

In this case, the training period can be $(T_2 - T_1)$ shorter than that of the above second and third information signals.

The level of the training data at the end of the training period $T_t$ is equal to zero. Then the actual data starts being formed immediately after the end of the training period $T_t$.

Figure 15:
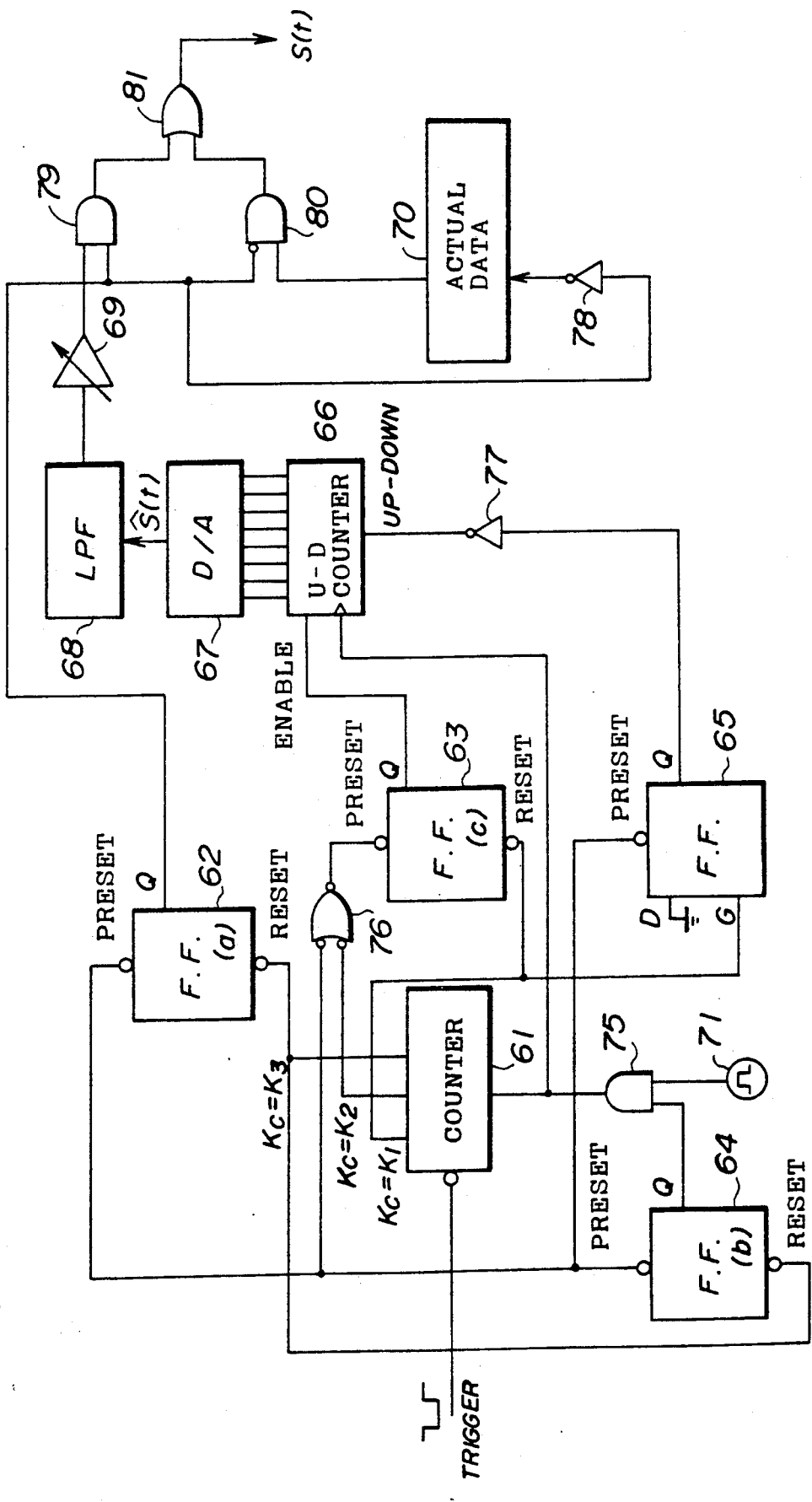
FIG. 15 is a block diagram illustrating a circuit for generating the fourth information signal shown in FIG. 14.

The fourth information signal S(t) including the trapezoid shaped training data and the actual data, shown in FIG. 14, is generated by a circuit, for example, shown in FIG. 15.

Referring to FIG. 15, the circuit has a counter 61, a first flip flop 62, a second flip flop 63, a third flip flop 64, a fourth flip flop 65, an up-down counter 66, a digital to analog converter 67, a low pass filter (LPF) 68, a variable-gain amplifier 69, an actual data generator 70, and a clock generator 71. The counter 61 is activated by a trigger signal supplied from a controller (not shown) at a time communication is started. The first, third and fourth flip flops 62, 64 and 65 are respectively preset by the trigger signal. The preset signal is also supplied via an OR gate 76 to the second flip flop 63 so as to preset the second flip flop 63. A clock signal is supplied from the clock generator 71 via an AND gate 75 to the counter 61 and the up-down counter 66. The AND gate 75 is controlled by an output signal Q of the third flip flop 64. The counter 61 counts the clock signal. When a count value in the counter 61 reaches $K_1$ corresponding to $T_1$, the counter 61 outputs a first control signal. When the count value in the counter 61 reaches $K_2$ corresponding to $T_2$, the counter 61 outputs a second control signal. Further, when the count value in the counter 61 reaches $K_3$ corresponding to $T_3 (= T_t)$, the counter 61 outputs a third control signal. The second and fourth flip flops 63 and 65 are respectively reset by the first control signal supplied from the counter 61. The first and third flip flops 62 and 64 are respectively reset by the third control signal supplied from the counter 61. The second control signal is supplied from the counter 61 via the OR gate 76 to the second flip flop 63 so that the second flip flop 63 is preset by the second control signal. When the second flip flop 63 is set, an output signal Q from the flip flop 63 puts the up-down counter 66 in an enabled state. In a case where the up-down counter 66 is in the enabled state, when the fourth flip flop 65 is set, the up-down counter 66 changes to an up-count mode based on an output signal Q supplied from the fourth flip flop 65 via an inverter 77 thereto. In this case, the up-down counter 66 increments in synchronism with the clock signal. When the fourth flip flop 65 is reset, the up-down counter 66 changes to a down-count mode. In this case, the up-down counter 66 decrements in synchronism with the clock signal. The digital to analog converter 67 converts the count value in the up-down counter 66 into a voltage level. The voltage level output from the digital to analog converter 67, like that output from the circuit shown in FIG. 12, is processed by the low pass filter 68 and the variable gain amplifier 69. The variable-gain amplifier 69 is connected to an AND gate 79 which is controlled by an output signal Q from the first flip flop 62. Further, the output signal from the first flip flop 62 is supplied to an inverted terminal of an AND gate 80 and then, via an inverter 78, to the actual data generator 70. When the first flip flop 62 is set, the actual data generator 70 is activated based on the output signal Q of the first flip flop 62. Both outputs of the AND gates 79 and 80 are respectively connected to an OR gate 81.

The circuit shown in FIG. 15 operates as follows.

Figure 16:
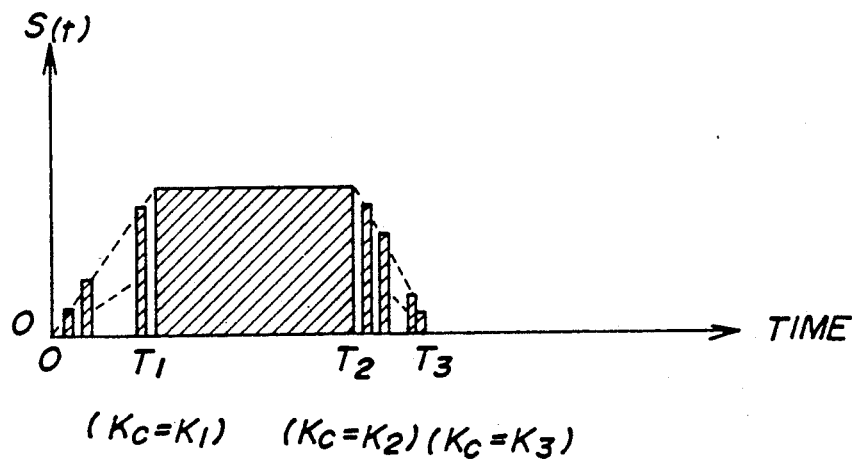
FIG. 16 is a detailed diagram illustrating training data included in the fourth information signal shown in FIG. 14.

When the trigger signal is supplied from the controller to this circuit when communication is started, the up-down counter 66 starts incrementing in synchronism with the clock signal supplied from the clock generator 71. During this up-counting of the up-down counter 66, the counter 61 counts the above clock signal. Then, when the count value in the counter 31 reaches $K_1$, the second flip flop 63 and the fourth flip flop 65 are respectively preset, and then the up-down counter 66 stops counting. After this, the count value in the up-down counter 66 is maintained, and the counter 61 continuously counts the clock signal. When the count value in the counter 61 reaches $K_2$, the second flip flop 63 is set, and then the up-down counter 66 is changed to the enable state again. Then, the up-down counter 66 starts decrementing in synchronism with the clock signal. Further, the counter 61 continuously counts the clock signal. For example, in a case where $K_1$ is equal to ($K_3$-$K_2$), when the count value in the counter 61 reaches $K_3$, the up-down counter 66 becomes zero. In this case, the count value in the up-down counter 66 varies as shown in FIG. 16. That is, the trapezoid shaped training data as shown in FIG. 16 is supplied via the AND gate 79 and the OR gate 81, as the information signal S(t), to the adder 1 in the transmitter shown in FIG. 2.

When the count value in the counter 61 reaches $K_3$, the AND gate 79 is closed and the AND gate 80 is opened. Thus, after this, the actual data output from the actual data generator 70 is supplied via the AND gate 80 and the OR gate 81, as the information signal S(t), to the adder 1 in the transmitter.

In this embodiment, the information signal S(t) corresponding to the training data has the trapezoid waveform. Thus, the maximum offset frequency $\Delta f_{st}$ is maintained for a predetermined time, so that the training period $T_t$ can be shorter than that in the triangular training data shown in FIG. 11.

The present invention is not limited to the aforementioned embodiments, and variations and modifications may be made without departing from the scope of the claimed invention.

What is claimed is:

1. An initial acquisition method for use in a spread spectrum system having a transmitter in which a frequency of a first code signal is modulated in accordance with information, the first code signal repeating a predetermined pattern at a basic frequency, and a receiver in which a received first code signal is demodulated based on a synchronization between the received first code signal and a second code signal which repeats the same pattern at the same basic frequency as the first code signal, said initial acquisition method comprising the following steps (a) and (b) of:
    (a) transmitting a training signal from said transmitter, the training signal being obtained by changing the frequency of the first code signal from the basic frequency before the frequency of the first code signal is modulated; and
    (b) carrying out a sliding correlation in said receiver based on a difference between a frequency of the training signal and the basic frequency of the second code signal, so that an initial acquisition is achieved by the sliding correlation.

2. An initial acquisition as claimed in claim 1, wherein the first code signal and the second code signal are pseudonoise sequence signals.

3. An initial acquisition method as claimed in claim 1, wherein said step (a) includes a step of shifting the frequency of the first code signal from the basic frequency by a predetermined value, and wherein the first code signal corresponding to the information is transmitted from said transmitter a predetermined time after the training signal is completely transmitted.

4. An initial acquisition method as claimed in claim 1, where in said step (a) includes a step of gradually decreasing the frequency of the first code signal from a predetermined value to the basic frequency.

5. An initial acquisition method as claimed in claim 4, wherein the frequency of the first code signal is decreased at a rate of $\Delta f_t/T_t$, where $\Delta f_t$ is a difference between the predetermined value and the basic frequency and $T_t$ is a period for transmitting the training signal.

6. An initial acquisition method as claimed in claim 1, wherein step (a) includes a step of changing the frequency of the first code signal so that the frequency thereof is increased from the basic frequency to a maximum value and after this the frequency thereof is decreased from the maximum value to the basic frequency.

7. An initial acquisition method as claimed in claim 6, wherein the frequency of the first code signal is increased at a rate of $\Delta f_t/T_p$ and decreased at a rate of $\Delta f_t/(T_t-T_p)$, where $\Delta f_t$ is a difference between the basic frequency and the maximum value, $T_t$ is a period for transmitting the training signal and $T_p$ is a predetermined time less than $T_t$.

8. An initial acquisition method as claimed in claim 6, wherein the maximum value is maintained for a predetermined time.

9. An initial acquisition method as claimed in claim 8, wherein the frequency of the first code signal is increased at a rate of $\Delta f_t/T_1$ and the maximum value is maintained for a time of $(T_2-T_1)$, and then the frequency of the first code signal is decreased at a rate of $\Delta f_t/(T_3-T_2)$, where $\Delta f_t$ is a difference between the maximum value and the basic frequency, $T_3$ is a period for transmitting the training signal, and both $T_1$ and $T_2$ are times which fulfill a condition of $T_1 < T_2 T_3$.

10. A spread spectrum system comprising:
    a transmitter which modulates a frequency of a first code signal in accordance with information, the first code signal repeating a predetermined pattern at a basic frequency; and a receiver which demodulates a received first code signal based on a synchronization between the received first code signal and a second code signal which repeats the same pattern at the same basic frequency as the first code signal, wherein said transmitter has:

training means for transmitting a training signal which is obtained by changing the frequency of the first code signal from the basic frequency before the frequency of the first code signal is modulated, and said receiver has:

correlation means for carrying out a sliding correlation based on a difference between a frequency of the training signal and the basic frequency of the second code signal, so that an initial acquisition is achieved by the sliding correlation.

11. A spread spectrum system as claimed in claim 10, wherein the first code signal and the second code signal are pseudonoise sequence signals.

12. A spread spectrum system as claimed in claim 10, wherein said training means includes first means for shifting the frequency of the first code signal from the basic frequency by a predetermined value, and wherein the first code signal corresponding to the information is transmitted from said transmitter after a predetermined time after the training signal is completely transmitted.

13. A spread spectrum system as claimed in claim 10, wherein said training means includes second means for gradually decreasing the frequency of the first code signal from a predetermined value to the basic frequency.

14. A spread spectrum system as claimed in claim 13, wherein said second means decreases the frequency of the first code signal at a rate of $\Delta f_t/T_t$, where $\Delta f_t$ is a difference between the predetermined value and the basic frequency and $T_t$ is a period for transmitting the training signal.

15. A spread spectrum system as claimed in claim 10, wherein said training means includes third means for changing the frequency of the first code signal so that the frequency thereof is increased from the basic frequency to a maximum value and after this the frequency thereof is decreased from the maximum value to the basic frequency.

16. A spread spectrum system as claimed in claim 15, wherein said third means increases the frequency of the first code signal at a rate of $\Delta f_t/T_p$ and decreases the frequency thereof at a rate of $\Delta f_t/(T_t-T_p)$, where $\Delta f_t$ is a difference between the basic frequency and the maximum value, $T_t$ is a period for transmitting the training signal and $T_p$ is a predetermined time less than $T_t$.

17. A spread spectrum system as claimed in claim 15, wherein said third means has control means for maintaining the frequency of the training signal at the maximum value for a predetermined time.

18. A spread spectrum system as claimed in claim 17, wherein said control means maintains the frequency of the training signal at the maximum value for a time of $(T_2-T_1)$ after the frequency of the first code signal is increased at a rate of $\Delta f_t/T_1$, and the frequency of the first code signal is decreased at a rate of $\Delta f_t/(T_3-T_2)$ after the maximum value is maintained for the time of $(T_2-T_1)$, where $\Delta f_t$ is a difference between the maximum value and the basic frequency, $T_3$ is a period for transmitting the training signal, and both $T_1$ and $T_2$ are times which fulfill a condition of $T_1<T_2<T_3$.

19. A spread spectrum system as claimed in claim 10, wherein said transmitter has a voltage control oscillator which outputs a control signal having a frequency corresponding to an input signal level supplied said voltage control oscillator, a signal having a level corresponding to the information being supplied, as the input signal, to said voltage control oscillator so that a frequency of the control signal is modulated in accordance with the information, and a code generator which generates the first code signal based on the control signal output from said voltage control oscillator, the first code signal having a frequency corresponding to that of the control signal, and wherein said training means has supplying means for supplying an offset signal to said voltage control oscillator, the offset signal having a level different from a basic level corresponding to the basic frequency, and the first code signal which is obtained by said code generator when the offset signal is supplied to said voltage control oscillator being used as the training signal.

20. A spread spectrum system as claimed in claim 19, wherein said supplying means has fourth means for maintaining a level of the offset signal at a constant value for a predetermined time, and wherein the first code signal corresponding to the information is transmitted from said transmitter after a predetermined time from a time when the training signal is completely transmitted.

21. A spread spectrum system as claimed in claim 19, wherein said supplying means has fifth means for gradually decreasing a level of the offset signal from a predetermined value to zero.

22. A spread spectrum system as claimed in claim 21, wherein said fifth means decreases the level of the offset signal at a rate of $\Delta V_t/T_t$, where $\Delta V_t$ is the predetermined value and $T_t$ is a period for transmitting the training signal.

23. A spread spectrum system as claimed in claim 19, wherein said supplying means has sixth means for changing a level of the offset signal so that the level thereof is increased from zero to a maximum value and after this the level thereof is decreased from the maximum value to zero.

24. A spread spectrum system as claimed in claim 23, wherein said sixth means increases the level of the offset signal at a rate of $\Delta V_t/T_p$ and decreases the level thereof at a rate of $\Delta V_t/(T_t-T_p)$, where $\Delta V_t$ is the maximum value, $T_t$ is a period for transmitting the training signal and $T_p$ is a predetermined time less than $T_t$.

25. A spread spectrum system as claimed in claim 23, wherein said sixth means has maintaining means for maintaining the level of the offset signal at the maximum value for a predetermined time.

26. A spread spectrum system as claimed in claim 25, wherein said maintaining means maintains the level of the offset signal at the maximum value for a time of $(T_2-T_1)$ after the level of the offset signal is increased at a rate of $\Delta V_t/T_1$, and the level of the offset signal is decreased at a rate of $\Delta V_t/(T_3-T_2)$ after the level of the offset signal is maintained at the maximum value for the time of $(T_2-T_1)$, where $\Delta V_t$ is the maximum value, $T_3$ is a period for transmitting the training signal, and both $T_1$ and $T_2$ are times which fulfill a condition $T_1<T_2<T_3$.

* * * * *